F. B. HARDSOCG.
GRASS HOOK.
APPLICATION FILED MAR. 22, 1913.
1,124,895. Patented Jan. 12, 1915.
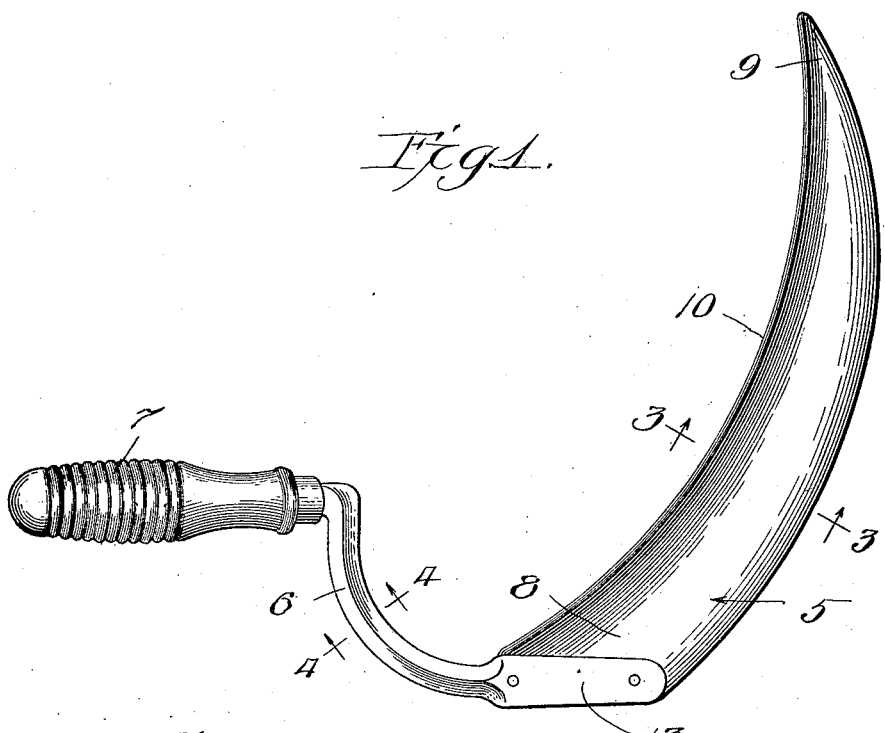
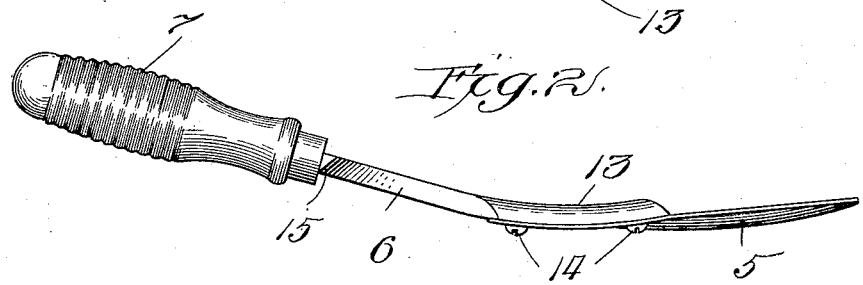
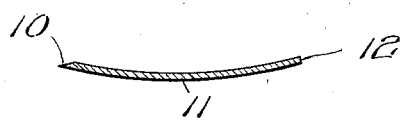
Witnesses: Inventor: Fred B. Hardsocg

UNITED STATES PATENT OFFICE.

FRED B. HARDSOCG, OF OTTUMWA, IOWA.

GRASS-HOOK.

1,124,895. Specification of Letters Patent. Patented Jan. 12, 1915.

Application filed March 22, 1913. Serial No. 756,176.

*To all whom it may concern:*

Be it known that I, FRED B. HARDSOCG, a citizen of the United States, residing at Ottumwa, in the county of Wapello and State of Iowa, have invented certain new and useful Improvements in Grass-Hooks, of which the following is a specification.

The present invention relates to an improved form and construction of grass hook and mounting therefor, having particular reference to the shape of the blade and to the form of mounting whereby the blade may be most easily and effectively manipulated for cutting purposes.

The invention further has reference to that form or type of grass hook in which the blade is made detachable from the mounting, so that, in case the blade becomes injured or broken, a new one can be readily substituted without the necessity of discarding the mounting itself.

The main object of the invention is to so shape or curve the blade and to so mount it or shape it with respect to the handle that when the user assumes the natural position for manipulating the grass hook, the blade will lie in such a position as to perform its cutting function in the most effective manner.

Another feature of the invention has for its object the provision of a blade of such shape as to give a maximum of strength and resisting power, combined with the simplest design possible, so as to obtain the necessary strength without unduly increasing the cost of manufacture.

Other objects and uses will appear from a detailed description of the invention, which consists in the features of construction and combination of parts hereinafter described and claimed.

In the drawings: Figure 1 shows a plan view of the grass hook, the blade being attached to the mounting in the manner intended; Fig. 2 shows an end elevation corresponding to Fig. 1, and brings out more particularly the shape of the mounting, whereby the surface of the blade lies in a substantially horizontal plane, while the handle is tipped up at the desired elevation; Fig. 3 is a section taken on line 3—3 of Fig. 1, looking in the direction of the arrows; and Fig. 4 is a section taken on line 4—4 of Fig. 1, looking in the direction of the arrows.

The blade of the grass hook is designated by the numeral 5; the mounting by the numeral 6; and the handle by the numeral 7. In plan, the blade is curved out from its end 8 to its end 9, so that its cutting edge 10 lies substantially on the arc of a circle, although the curvature at the end 8 is somewhat sharper than that at the end 9. The blade is also tapered in breadth from the end 8 to the end 9, so as to provide a maximum of strength in the end 8, which is to be attached to the mounting. In cross section, the blade is curved, as shown in Fig. 3, so that its central portion 11 is depressed below the cutting edge 10 and the rear edge 12. By curving or depressing the blade in this manner, its stiffness is very greatly increased, and at the same time the cutting edge 10 is freer to perform its cutting function than would be the case if the central portion 11 were of equal elevation with the cutting edge.

The mounting 6 may be made of any suitable material, and is generally of a different material from that of the blade. For example, the blade may be of tempered or hardened steel, so as to increase the life of the cutting edge, while preserving the necessary amount of flexibility or elasticity in the blade, while the mounting may be of cast iron or brass or the like. The mounting is preferably curved in its central portion, and has its end 13 straightened out so as to lie square against the end 8 of the blade. The connection between the mounting and the blade may be effected in any suitable manner, as, for example, by screws 14 passing up through the blade into the mounting. The connection should also be formed in such a manner that the cutting edge at the end 8 retreats rapidly from the mounting, as shown particularly in Fig. 1.

The mounting is provided with an extension 15, which lies at substantially right angles to the curved portion of the mounting, and the handle 7 may be driven on to or otherwise secured to this extension. By forming the extension at right angles to the curved portion of the mounting, as shown particularly in Fig. 1, the handle will lie substantially parallel to the end 13 of the mounting, so that the cutting edge of the blade will lie in the most advantageous direction with respect to the handle.

As shown particularly in Fig. 2, the curved portion of the mounting slants upward with respect to the end 13 thereof, so that the handle also slants upward when the blade lies in a horizontal position. By so forming the parts, the user can maintain the blade in a horizontal position during its manipulation, without having to twist his wrist so as to bring the handle into a horizontal position. In other words, the form of the parts is such as to permit a natural and ready manipulation of the blade.

As shown particularly in Fig. 4, the central portion of the mounting is preferably of triangular cross section, as this form gives the necessary strength and rigidity, combined with a minimum amount of material.

I desire to call particular attention to the matter of the cross section of the blade, which cross section is well illustrated in Fig. 3. It was previously stated that the central portion 11 is depressed as compared to the cutting edge 12. This depression serves not only to reinforce or stiffen the blade, but it serves to provide a support for the blade when the latter is being used in the cutting operation. For example, if the blade is drawn for the cutting operation close to the surface of the ground there would be danger of the cutting edge striking obstructions, such as stones and the like and thus becoming nicked or dulled. However, by the provision of the depressed portion 11 the cutting edge is held supported above the surface of the ground so that any danger of striking stones and the like is eliminated. In other words, the depression serves the two functions of reinforcing or stiffening the blade, and of supporting the cutting edge above the surface of the ground.

I claim:

As a new article of manufacture a grass hook having a curved blade tapering in width from a broad handle end to a point at the other end, said blade being of dished cross section, the inner edge of the blade curve being sharpened, a handle mounting secured to the broad end of the blade, said mounting having a central curved portion formed in a plane which lies substantially tangent to the surface of the blade at the sharpened edge thereof, and a hand grip secured to the end of said curved portion, said hand grip lying substantially parallel to the broad end of the blade and lying in the aforementioned plane, whereby when the hand grip is held at an angle to the turf with the central portion of the blade in contact with the turf the cutting edge of the blade is supported above the turf.

FRED B. HARDSOCG.

Witnesses:
W. D. TISDALE,
ARTHUR M. BARTLETT.

Copies of this patent may be obtained for five cents each, by addressing the "Commissioner of Patents, Washington, D. C."